(12) United States Patent
Nadkarni et al.

(10) Patent No.: US 6,640,609 B1
(45) Date of Patent: Nov. 4, 2003

(54) SPECTRAL METHOD FOR CALIBRATING ACCELEROMETERS

(75) Inventors: Vivek B. Nadkarni, Sunnyvale, CA (US); Philip Winslow, Hayward, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 136 days.

(21) Appl. No.: 09/917,501

(22) Filed: Jul. 27, 2001

(51) Int. Cl.$^7$ .............................................. G01P 21/00
(52) U.S. Cl. ...................................................... 73/1.37
(58) Field of Search ................................. 73/1.37, 1.38; 701/85, 96, 104

(56) References Cited

U.S. PATENT DOCUMENTS 3,350,916 A * 11/1967 Bock

* cited by examiner

*Primary Examiner*—Robert Raevis
(74) *Attorney, Agent, or Firm*—Wagner, Murabito & Hao LLP

(57) ABSTRACT

A method for determining a scale factor of an accelerometer. The scale factor is used to precisely convert the electrical output of the accelerometer into units of acceleration. The accelerometer to be calibrated is mounted on a turntable mechanism. The turntable is configured so that the axis of rotation of the turntable is tilted with respect to the local gravity vector. The turntable is then spun around the axis of rotation at an angular velocity, such that the accelerometer experiences a time varying component of the local gravity vector. The output of the accelerometer is logged as the accelerometer experiences the time varying component of the local gravity vector. The logged output of the accelerometer is compared to a predicted output of the accelerometer, wherein the predicted output is based on the tilt angle of the turntable and the angular velocity of the turntable and on the value of gravitational acceleration at the location of calibration.

14 Claims, 4 Drawing Sheets

SPECTRAL METHOD FOR CALIBRATING ACCELEROMETERS

TECHNICAL FIELD

The present invention relates generally to methods and systems for the precise calibration of instruments. More specifically, the present invention pertains to an accurate and efficient process for calibrating accelerometers.

BACKGROUND ART

An accelerometer is a transducer used for measuring acceleration. Acceleration is usually measured along a sensitive axis of the accelerometer. Generally, the magnitude of an applied acceleration is communicatively coupled to external instruments or circuits as an electrical impulse (e.g., voltage) having an amplitude proportional to the magnitude of the applied acceleration. The electrical impulse comprises the measured acceleration and is processed by the external circuits as required for a variety of applications. One such application is, for example, an Inertial Measurement Unit (IMU), where acceleration measurements are used to generate velocity and positioning information.

The electrical impulse output of an accelerometer is proportional to the applied acceleration. The process of calibrating an accelerometer consists of computing a constant of proportionality, referred to as a scale factor of the accelerometer. The scale factor of an accelerometer precisely relates the amplitude of the electrical impulses comprising the measured acceleration to the magnitude of a corresponding applied acceleration along the sensitive axis of the accelerometer. For optimal precision of measurement, it is desirable to calibrate the accelerometer by precisely determining the accelerometer's scale factor.

Prior art systems for calibrating accelerometers (e.g., measuring and defining the scale factor) relied on comparisons of the accelerometers to certain standard devices. Such prior art systems necessarily assume that the standard devices themselves are properly calibrated, often leading to the introduction of additional error into the calibration process. For example, one prior art system (see prior art U.S. Pat. No. 5,970,779) requires the use of precisely controlled swing arm motor systems to which the accelerometer being tested is mounted, along with an appropriate counter weight. The swing arm motor would be precisely controlled by a processor to impart a simple harmonic motion acceleration to the sensitive axis of the accelerometer, and vary this acceleration by varying the angular acceleration of the swing arm. The resulting output of the accelerometer would be examined with respect to the controlled varying of the swing arm motor, and the scale factor would be determined therefrom.

One problem with the above prior art approach is that it requires a precisely controllable motor for varying the angular velocity of the accelerometer. The motor needs to precisely apply a simple harmonic acceleration to the accelerometer by varying the angular velocity about an axis of rotation. As described above, this system requires the proper calibration of the standard devices themselves (e.g., the motor), which often leads to additional error in the calibration of the accelerometer.

A second, more important drawback of the above prior art approach is that it requires measuring the radius of rotation of the accelerometer. This distance can be very difficult to measure accurately, since the measurement point of the accelerometer is internal to the accelerometer. Any error in this measurement will manifest itself in through a flawed calibration.

Thus what is required is a solution that accurately measures and determines the scale factor of an accelerometer without introducing unnecessary sources of error. The required solution should be precise and avoid reliance on standard devices, which can introduce error into the calibration process. The required solution should not rely on any time varying control of a standard device to impart variable acceleration. The present invention provides a novel solution to the above requirements.

DISCLOSURE OF THE INVENTION

The present invention provides a solution that accurately measures and defines the scale factor of an accelerometer. The method and system of the present invention is precise and avoids reliance on standard devices, which can introduce error into the calibration process. The present invention does not rely on any time varying control of a standard device to impart variable acceleration. It also does not rely on measuring the distance of the accelerometer from the axis of rotation.

In one embodiment, the present invention is implemented as a rotating turntable mechanism for determining a scale factor of an accelerometer. The scale factor is used to precisely calibrate the output of the accelerometer, ie to convert the output (voltage) of the accelerometer into units of acceleration. The accelerometer to be calibrated is mounted on a turntable mechanism. The turntable is configured so that the axis of rotation of the turntable is tilted with respect to the local gravity vector. The turntable is then spun around the axis of rotation at a constant angular velocity. This causes the accelerometer to experience a time varying component of the local gravity vector. The output of the accelerometer is logged as the accelerometer experiences the time varying component of the local gravity vector (e.g., due to the tilt angle). The logged output of the accelerometer is compared to a predicted output of the accelerometer (e.g., a sine wave), wherein the predicted output is based on the tilt angle of the turntable and the angular velocity of the turntable. This comparison is done in the spectral domain. This separates out the bias drift of the accelerometer and prevents this bias drift from corrupting the scale factor measurements. In so doing, the turntable mechanism of the present invention accurately measures and determines the scale factor of the accelerometer without relying on any time varying control of a standard device (e.g., stepper motor, etc.) to impart variable acceleration to the accelerometer, and without relying on a precise measurement of the radius of rotation of the accelerometer.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1:
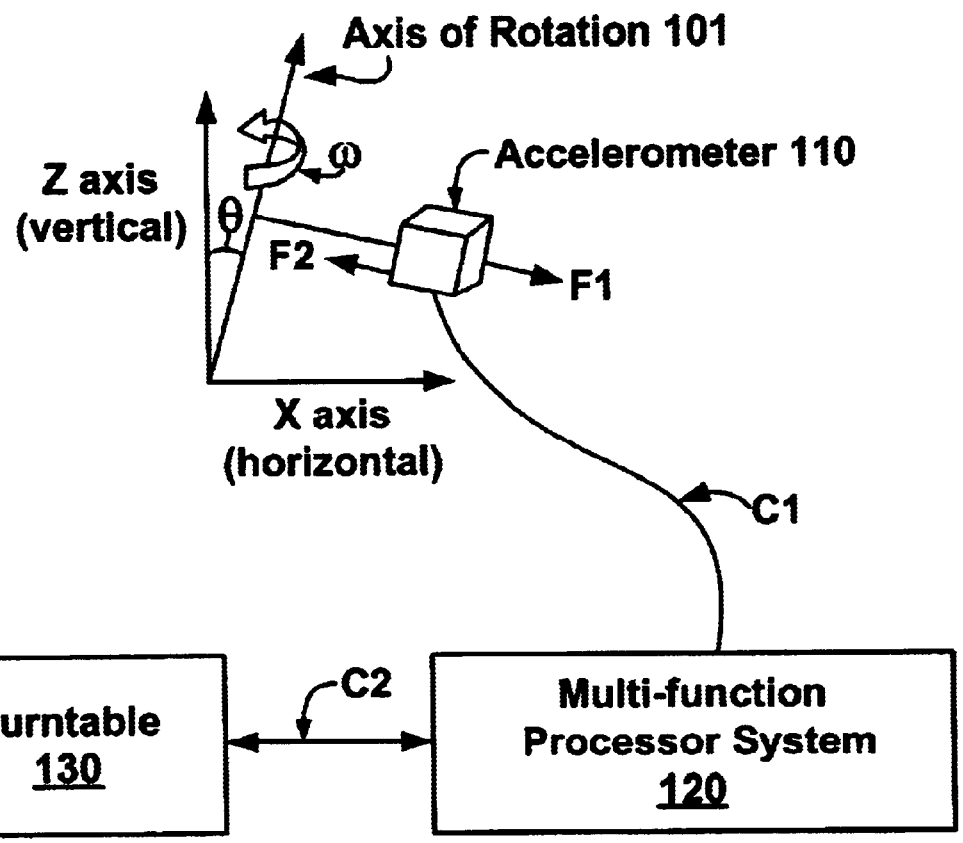
FIG. 1 shows an accelerometer calibration system in accordance with one embodiment of the present invention.

Reference will now be made in detail to the embodiments of the invention, a spectral method for calibrating accelerometers, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The present invention is a spectral method and system for calibrating accelerometers. The present invention provides a solution that accurately measures and determines the scale factor of an accelerometer. The method and system of the present invention is precise and avoids reliance on standard devices which can introduce error into the calibration process. It also does not rely on a measurement of the radius about which the accelerometer rotates. The present invention and its benefits are further described below.

Notation and Nomenclature

Some portions of the detailed descriptions, which follow, are presented in terms of procedures, steps, logic blocks, processing, and other symbolic representations of operations on data bits within a computer memory. These descriptions and representations are the means used by those skilled in the data processing arts to convey most effectively the substance of their work to others skilled in the art. A procedure, computer-executed step, logic block, process, etc., are here, and generally, conceived to be self-consistent sequences of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussions, it is appreciated that throughout the present invention, discussions utilizing terms such as "processing," "computing," "configuring," "comparing," "determining," "sampling," "transforming," or the like, refer to the action and processes of a computer system (e.g., computer system 404 of FIG. 4), or similar electronic computing device, that manipulates and transforms data represented as physical (electronic) quantities within the computer system's registers and memories into other data similarly represented as physical quantities within the computer system registers or memories or other such information storage, transmission, or display devices.

Embodiment of the Invention

Referring now to FIG. 1, an accelerometer calibration system 100 in accordance with one embodiment of the present invention is shown. As depicted in FIG. 1, the calibration system 100 utilizes a turntable 130 and a multifunction processor system 120 to calibrate the output of an accelerometer 110. The accelerometer 110 is mounted on turntable 130 such that a sensitive axis of the accelerometer is perpendicular to an axis of rotation of the turntable 130. The axis of rotation of turntable 130 is tilted with respect to a vertical Z axis by an angle $\theta$. The Z axis is precisely vertical, parallel to the local gravity vector, g. During the calibration process, the turntable rotates accelerometer 110 about the axis of rotation at a constant angular velocity $\omega$.

The rotation of the turntable about the axis of rotation at the angular velocity $\omega$ gives rise to two forces acting on the accelerometer 110, shown as F1 and F2. F2 is a centripetal force of constant magnitude acting on the accelerometer. F1 is a time varying force with amplitude $g*\sin(\theta)*\cos(\phi(t))$. Here $\theta$ is the angle of tilt of the axis of rotation from the vertical (e.g., the Z axis), as shown in FIG. 1. $\phi$ is the angle subtended at the axis of rotation by the accelerometer 110 and the component of gravity in the plane of rotation of the accelerometer 110. $\phi$ is a function of time t. Specifically, $\phi = \omega t$. g is the acceleration due to gravity. The angular velocity $\omega = d\phi/dt$. The voltage output of the accelerometer 110 (e.g., the measured acceleration) is equal to $\alpha*g*\sin(\theta)*\cos(\phi(t))$ where $\alpha$ is the scale factor of the accelerometer 110. A connector C1 couples this output voltage from the accelerometer 110 to the multifunction processor 120 as depicted in FIG. 1. In this embodiment, a connector C2 connects the multifunction processor system 120 to turntable 130 to send and receive information regarding the angular velocity $\omega$.

Figure 2:
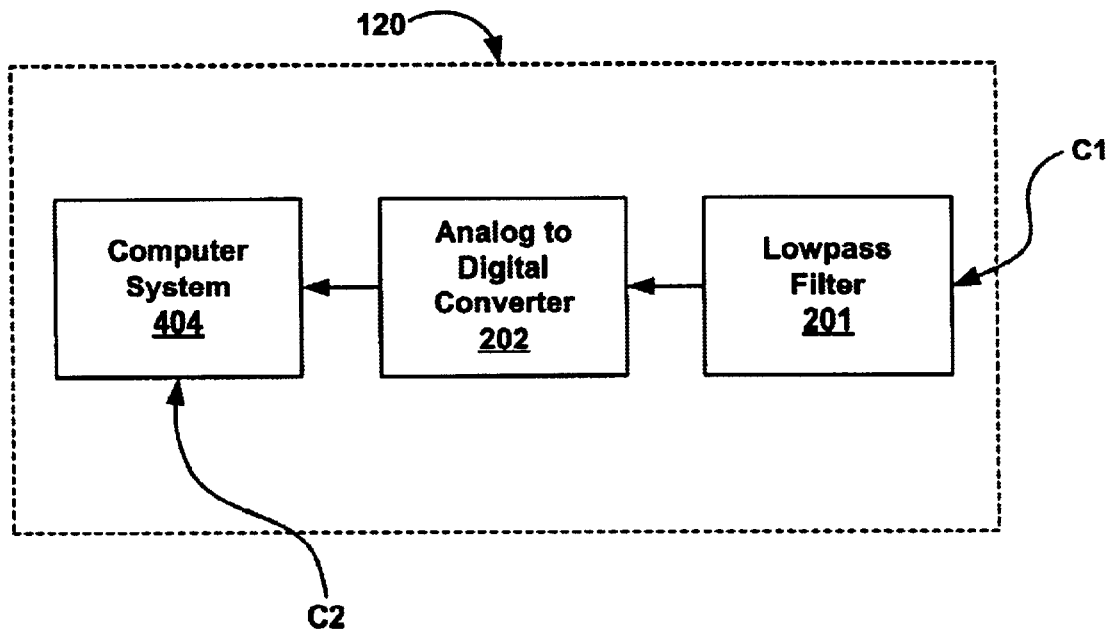
FIG. 2 shows the components of the multifunction processor in accordance with one embodiment of the present invention.

Referring now to FIG. 2, the components of the multifunction processor 120 in accordance with one embodiment of the present invention are shown. The multifunction processor 120 first uses a low pass filter 201 to filter the voltage output of the accelerometer 110 (e.g., signal C1). An analog to digital converter 202 converts the signal received from low pass filter 201 into digital form. This process of low pass filtering and then performing the analog to digital conversion on the signal is referred to as sampling. The number of times a second the sampling is performed is referred to as the sampling frequency ($f_s$). Low pass filter 201 is designed to block all signals that have a frequency greater than a certain frequency, referred to as the cutoff frequency of the low pass filter, but to let through, or pass, all signals that have a frequency lower than the cutoff frequency. In the present embodiment, low pass filter 201 has a cutoff frequency that is lower than $f_s/2$.

The computer system 404 then logs this sampled data. This logging is performed for a period of time longer than that required for multiple complete revolutions of the axis of rotation. Computer system 404 then takes a Discrete Fourier Transform (DFT) of this logged voltage output. In the Fourier domain, all the energy in F2 is seen around zero frequency, while all the energy in the time varying force F1 is seen concentrated in the discrete DFT bins corresponding to the frequency $\omega$. This can be seen as a peak in the DFT at the bins corresponding to the frequency $\omega$. Since the DFT is a linear operation, the amplitude of the DFT at the frequency $\omega$ is proportional to $\alpha*g*\sin(\theta)$. Where the peak amplitude of the DFT is referred to as P1, the following equation holds true:

$$P1 = k*a*g*\sin(\theta)$$

in which k is a constant of proportionality obtained during the process of taking the DFT of the signal.

The computer system 404 also generates a sampled version of a sine wave internally, of amplitude $\alpha\_nominal*g\_nominal*\sin(\theta\_measured)*\cos(\phi(t)+\phi_0)$. This sine wave comprises the predicted output of the accelerometer 110. Here $\alpha\_nominal$ is the expected scale factor of the accelerometer, $g\_nominal$ is the value of earth's gravitational acceleration at the point the accelerometer measurements are being taken, $\theta\_measured$ is the measured tilt of the axis of rotation, and $\phi(t)$ is a monotonically increasing function with constant derivative ($\omega$). Specifically, $\phi=\omega t$. Also, $\phi_0$ is a constant phase offset, since the exact phase of the turntable is unknown when data logging begins. Computer system 404 takes the DFT of this sampled sine wave. The energy in this sampled sine wave can also be seen in the DFT as a peak in the DFT bins corresponding to the frequency of the sine wave.

The energy in this sampled sine wave is also seen as a peak of this DFT at the bins corresponding to the frequency $\omega$. Again, since the DFT is a linear operation, the amplitude of the DFT at the frequency to is proportional to $\alpha\_nominal*g\_nominal*\sin(\theta\_measured)$. Where the peak value of this DFT is referred to as P2, the following equation holds true:

$$P2 = k * \alpha\_nominal * g\_nominal * \sin(\theta\_measured)$$

where k is the same constant of proportionality found in calculating P1.

The tilt angle $\theta$ is measured using an accurate tilt sensor. Therefore $\theta\_measured=\theta$. Also, $g\_nominal=9.80665$ m/s$^2$=the approximate acceleration due to gravity. The errors in measuring the tilt angle and gravity are negligible in comparison to the required accuracy of the scale factor computation, and hence, these errors are ignored. Therefore, $P1/P2=\alpha/\alpha\_nominal$. Therefore, using this formula, the true scale factor $\alpha$ can be calculated by computer system 404.

Figure 3:
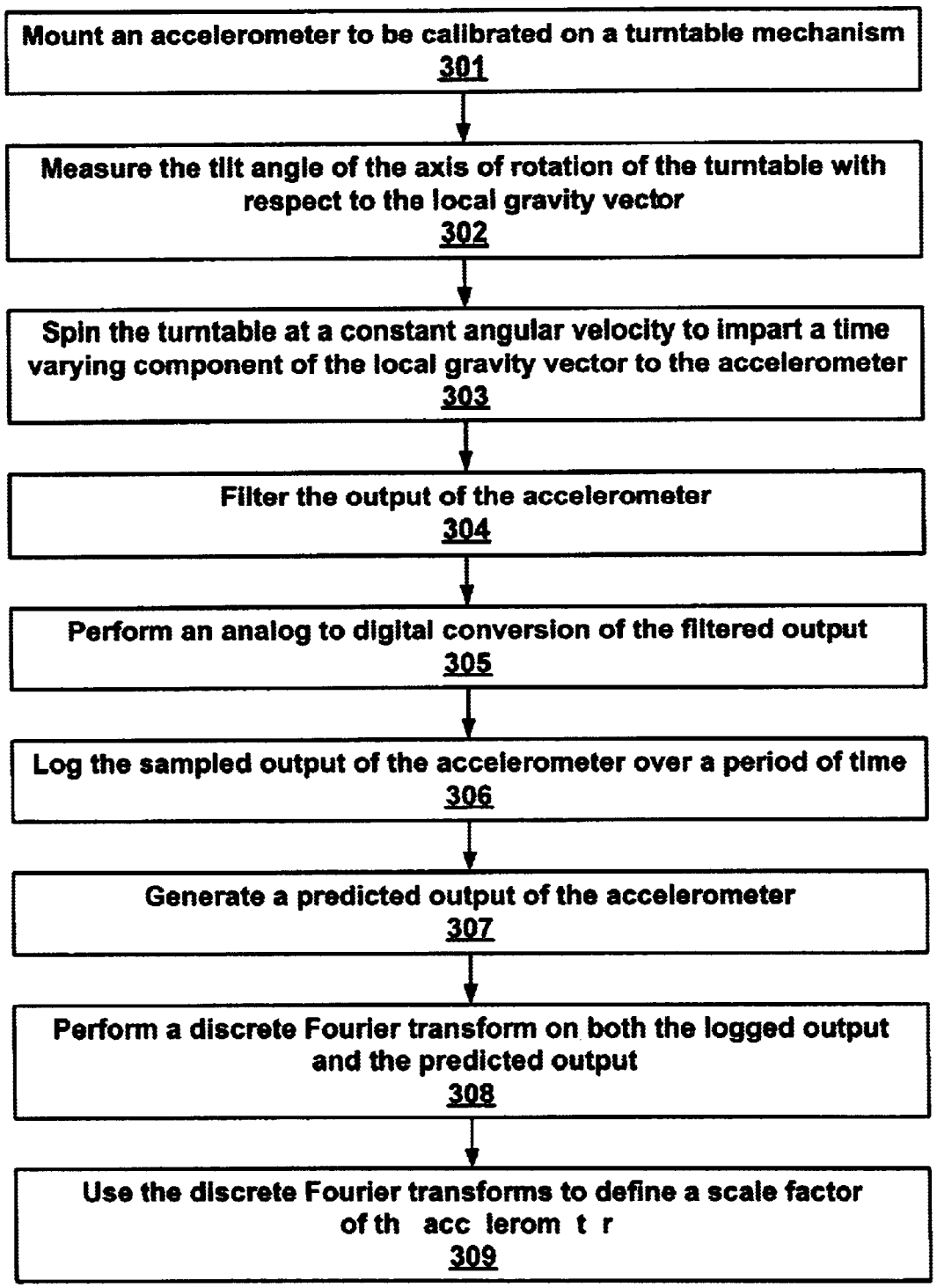
FIG. 3 shows a flowchart of the steps of an accelerometer calibration process in accordance with one embodiment of the present invention.

Referring now to FIG. 3, a flowchart showing the steps of a process 300 in accordance with one embodiment of the present invention is shown. As depicted in FIG. 3, process 300 shows the operating steps of the calibration system (e.g., system 100 of FIG. 1) calibrating an accelerometer (e.g., accelerometer 110).

Process 300 begins in step 301, where the accelerometer to be calibrated is mounted on a turntable mechanism. In step 302, a tilt angle of the turntable with respect to the local gravity vector is measured. As described above, this tilt angle (e.g., $\theta$) describes the angle formed by the axis of rotation of the turntable and the local gravity vector (e.g., the vertical, or Z axis). In step 303, the turntable is spun around the axis of rotation at an angular velocity $\omega$. As described above, the rotation gives rise to two forces acting on the accelerometer; a centripetal force of constant magnitude acting on the accelerometer, and a time varying force due to a component of the local gravity vector. In step 304, the output of the accelerometer is filtered using a low pass filter. In step 305, the filtered output of the accelerometer is processed through an analog to digital converter yielding a sampled output of the accelerometer.

Referring still to process 300 of FIG. 3, in step 306, the sampled output of the accelerometer is logged as the accelerometer experiences the time varying component of the local gravity vector. In step 307, a predicted output of the accelerometer is generated. In step 308, a discrete Fourier transform is performed on both the logged output and the predicted output of the accelerometer. Hence, in step 309, the respective discrete Fourier transforms of the predicted output and the logged output are compared in order to determine the scale factor of the accelerometer.

In so doing, the turntable mechanism of the present invention accurately measures and determines the scale factor of the accelerometer without requiring any measurement of the distance of the accelerometer from the axis of rotation and also without relying on any time varying control of a standard device (e.g., stepper motor, etc.) to impart variable acceleration to the accelerometer.

Thus, the present invention provides a solution that accurately measures and defines the scale factor of an accelerometer. The method and system of the present invention is precise and avoids reliance on standard devices which can introduce error into the calibration process. The present invention does not rely on any time varying control of a standard device to impart variable acceleration.

Computer System Environment

Figure 4:
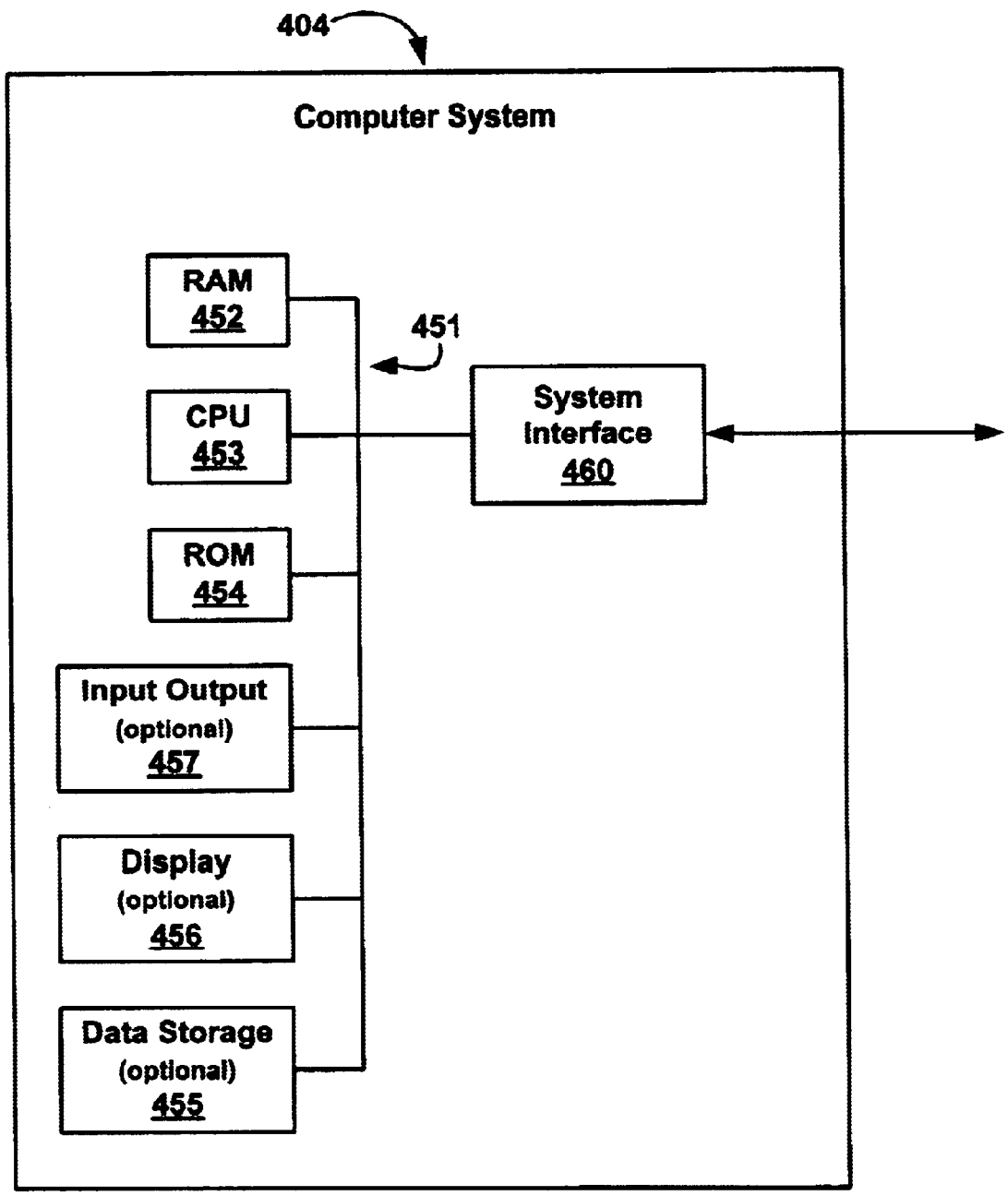
FIG. 4 shows a diagram of the basic components of a computer system in accordance with one embodiment of the present invention.

FIG. 4 shows a diagram of the basic components of computer system 404. Within the above discussions of the present invention, certain processes and steps are discussed that are realized, in one embodiment, as a series of instructions (e.g., software program) that reside within computer readable memory units of computer system 404 and executed by the processor(s) of system 404. When executed, the instructions cause the computer system 404 to perform specific actions and exhibit specific behavior which was described in detail above.

In general, computer system 404 used by the present invention comprises an address/data bus 451 for communicating information, one or more central processors 453 coupled with bus 451 for processing information and instructions, a computer readable volatile memory unit 452 (e.g., random access memory, static RAM, dynamic RAM, etc.) coupled with bus 451 for storing information and instructions for central processor(s) 453, a computer readable non-volatile memory unit 454 (e.g., read only memory, programmable ROM, flash memory, EPROM, EEPROM, etc.) coupled with bus 451 for storing static information and instructions for central processor(s) 453. Computer system 404 interfaces with the other components of system 100 via system interface 460. System 404 can optionally include a mass storage computer readable data storage device 455, such as a magnetic or optical disk and disk drive coupled with bus 451, for storing information and instructions, a display 456 for displaying information to the computer user, and an input output device 457 including, for example, alphanumeric and function keys for communicating information and command selections, cursor control inputs, command selections, etc.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the Claims appended hereto and their equivalents.

What is claimed is:

1. A method for determining a scale factor of an accelerometer, comprising the steps of:

a) mounting an accelerometer on a turntable, the axis of rotation of the turntable having a tilt angle with respect to a vertical axis defined by a local gravity vector;

b) spinning the accelerometer around an axis of rotation at an angular velocity using the turn table such that the accelerometer experiences a time varying component of the local gravity vector;

c) receiving an output of the accelerometer as the accelerometer experiences the time varying component of the local gravity vector; and d) determining a scale factor of the accelerometer by comparing the received output of the accelerometer with a predicted output of the accelerometer, the predicted output based on the tilt angle, the angular velocity of the accelerometer and gravitational acceleration.

2. The method of claim 1 wherein the angular velocity is constant during the receiving.

3. The method of claim 1 wherein the time varying component of the local gravity vector is equal to $g*\sin(\theta)*\cos(\phi(t))$, where $\theta$ is the tilt angle, g is the acceleration due to gravity, and $\phi$ is an angle subtended at the axis of rotation by the accelerometer and the component of gravity in the plane of rotation of the accelerometer.

4. The method of claim 1 further including the step of filtering the output of the accelerometer using a low pass filter.

5. The method of claim 4 further including the step of sampling the low pass filtered output of the accelerometer using an analog to digital converter.

6. The method of claim 5 further including the step of receiving the sampled output of the accelerometer and comparing the received sampled output of the accelerometer with the predicted output of the accelerometer to determine the scale factor.

7. The method of claim 1 further including the steps of:

taking a Fourier transform of the received output of the accelerometer;

taking a Fourier transform of the predicted output of the accelerometer; and comparing the respective Fourier transforms of the received output and the predicted output to determine the scale factor of the accelerometer.

8. A system for determining a scale factor of an accelerometer, comprising:

a turn table mechanism configured to mount an accelerometer for calibration, the turntable having a tilt angle with respect to a vertical axis defined by a local gravity vector, the turntable configured to spin the accelerometer around an axis of rotation at an angular velocity such that the accelerometer experiences a time varying component of the local gravity vector; and a processor system coupled to receive the output of the accelerometer, the processor system configured to log the output of the accelerometer as the accelerometer experiences the time varying component of the local gravity vector and to determine a scale factor of the accelerometer by comparing the logged output of the accelerometer with a predicted output of the accelerometer, the predicted output based on the tilt angle and the angular velocity of the accelerometer.

9. The system of claim 8 wherein the turntable is configured to maintain a constant angular velocity during the logging.

10. The system of claim 8 wherein the time varying component of the local gravity vector is equal to $g*\sin(\theta)*\cos(\phi(t))$, where $\theta$ is the tilt angle, g is the acceleration due to gravity, and $\phi$ is an angle subtended at the axis of rotation by the accelerometer and the component of gravity in the plane of rotation of the accelerometer.

11. The system of claim 8 further including a low pass filter for filtering the output of the accelerometer.

12. The system of claim 11 further including an analog to digital converter for sampling the low pass filtered output of the accelerometer.

13. The system of claim 12 wherein the processor system is further configured to determine the scale factor of the accelerometer by logging the sampled output of the accelerometer and comparing the sampled logged output of the accelerometer with the predicted output of the accelerometer.

14. The system of claim 13 wherein the processor system is further configured to determine the scale factor of the accelerometer by:

taking a Fourier transform of the logged output of the accelerometer;

taking a Fourier transform of the predicted output of the accelerometer; and comparing the respective Fourier transforms of the logged output and the predicted output to determine the scale factor of the accelerometer.

\* \* \* \* \*